United States Patent
Maeda

(10) Patent No.: US 11,884,209 B2
(45) Date of Patent: Jan. 30, 2024

(54) SOUND SIGNAL GENERATION DEVICE, SOUND SIGNAL GENERATION METHOD, AND SOUND SIGNAL GENERATION PROGRAM

(71) Applicant: SOUND DESIGN LAB LLC, Iwata (JP)

(72) Inventor: Osamu Maeda, Iwata (JP)

(73) Assignee: SOUND DESIGN LAB LLC, Iwata (JP)

(*) Notice: Subject to any disclaimer, the term of this patent is extended or adjusted under 35 U.S.C. 154(b) by 69 days.

(21) Appl. No.: 17/616,432

(22) PCT Filed: May 11, 2020

(86) PCT No.: PCT/JP2020/018868
§ 371 (c)(1),
(2) Date: Dec. 3, 2021

(87) PCT Pub. No.: WO2021/229656
PCT Pub. Date: Nov. 18, 2021

(65) Prior Publication Data
US 2022/0234498 A1    Jul. 28, 2022

(51) Int. Cl.
*B60Q 5/00* (2006.01)
*G10K 15/02* (2006.01)

(52) U.S. Cl.
CPC ............. *B60Q 5/008* (2013.01); *G10K 15/02* (2013.01)

(58) Field of Classification Search
CPC ................................ B60Q 5/008; G10K 15/02
See application file for complete search history.

(56) References Cited

U.S. PATENT DOCUMENTS

| 9,156,401 | B2 | 10/2015 | Takahashi et al. | |
| 2005/0113168 | A1* | 5/2005 | Maeda | G10K 15/02 463/35 |
| 2014/0375443 | A1* | 12/2014 | Aoyagi | B60Q 5/008 340/425.5 |

FOREIGN PATENT DOCUMENTS

JP    5646043 B2    12/2014

* cited by examiner

*Primary Examiner* — Daniel R Sellers
(74) *Attorney, Agent, or Firm* — Locke Lord LLP

(57) ABSTRACT

To provide a sound signal generation device capable of artificially generating an engine sound signal indicating a realistic engine sound linked to running of an electric vehicle even when, for example, an engine is not mounted at all. A virtual engine rotation speed generation unit that acquires accelerator opening data indicating an accelerator operation amount in the electric vehicle and running speed data indicating a vehicle running speed of the electric vehicle, calculates a virtual running speed of a virtual engine vehicle, modifies the virtual running speed on the basis of the running speed data, and calculates an engine rotation speed of a virtual engine on the basis of the modified virtual running speed, and an artificial engine sound generation unit that generates a sound signal for outputting an artificial engine sound corresponding to a running state of the electric vehicle on the basis of the accelerator operation amount.

8 Claims, 10 Drawing Sheets

Fig. 2

VARIABLE DATA

| | VARIABLE NAME | REFERENCE | UNIT | INITIAL VALUE (RANGE OF VALUE) |
|---|---|---|---|---|
| | ENGINE START SWITCH | Ssw | NONE | 0 (0 or 1) |
| VIRTUAL ENGINE VEHICLE-RELATED | ACCELERATOR OPENING | Ap | | 0 (0≦Ap≦100) |
| | ENGINE ROTATION SPEED | N | rpm | 0 (N≧0) |
| | NORMALIZED ENGINE ROTATION SPEED | Nn | NONE | 0 (0≦Nn≦100) |
| | ENGINE (OUTPUT SHAFT) OUTPUT TORQUE | Te | Nm | 0.0 |
| | ENGINE INTERNAL LOSS TORQUE | TL | | |
| | ENGINE ROTATION ANGULAR ACCELERATION | α | rad/s² | |
| | ENGINE ROTATION SPEED OF NEXT CYCLE | N' | rpm | 0 (N'≧0) |
| | ENGINE FULL-OPEN TORQUE COEFFICIENT | Tw | NONE | 0 (0≦Tw≦100) |
| | LOW-ROTATION OUTPUT TORQUE COEFFICIENT | C0 | | 0 (0≦C0≦100) |
| | HIGH-ROTATION OUTPUT TORQUE COEFFICIENT | Ch | | 0 (0≦Ch≦100) |
| | ESTIMATED OUTPUT TORQUE COEFFICIENT | Cot | | 0 (AROUND −1≦Cot≦1) |
| | TORQUE CONVERTER INPUT TORQUE | Tin | Nm | 0.0 |
| | TORQUE CONVERTER OUTPUT TORQUE | To | | |
| | ENGINE RESIDUAL TORQUE | Tr | | |
| | TORQUE CONVERTER TORQUE CAPACITY | Tc | | |
| | TORQUE CONVERTER INPUT SHAFT ROTATION SPEED | Ne | rpm | 0 |
| | TORQUE CONVERTER OUTPUT SHAFT ROTATION SPEED | No | | |
| | TORQUE CONVERTER SPEED RATIO | e | NONE | 0.0 |
| | LOCKUP STATUS | Lu | | 0 |
| | GEAR STAGE | Gp | | 0 (NEUTRAL) |
| | TOTAL REDUCTION RATIO | R | | 0.0 |
| | VEHICLE RUNNING SPEED | V | Km/h | |
| | VEHICLE RUNNING RESISTANCE | D | N | |
| | VEHICLE (FRONT-REAR DIRECTION) ACCELERATION | a | m/s² | |
| | VEHICLE RUNNING SPEED OF NEXT CYCLE | V' | Km/h | 0.0 (V'≧0) |
| | CALCULATION CYCLE TIME | Δt | msec | 0.0 |
| ELECTRIC VEHICLE-RELATED | VEHICLE RUNNING SPEED | Vm | Km/h | 0.0 |

Fig. 3

VEHICLE DATA

| | DATA NAME | REFERENCE | UNIT |
|---|---|---|---|
| ENGINE-RELATED | ENGINE ROTATION SPEED UPPER LIMIT | $N_{max}$ | rpm |
| | IDLING ROTATION SPEED | $N_i$ | |
| | ENGINE MAXIMUM TORQUE | $T_{max}$ | Nm |
| | ENGINE INTERNAL LOSS TORQUE COEFFICIENT | $C_f$ | NONE |
| | ENGINE INTERNAL LOSS TORQUE CALCULATION CONSTANT | $a_1$ | |
| | ENGINE INTERNAL LOSS TORQUE CALCULATION CONSTANT | $a_2$ | |
| | ENGINE INTERNAL LOSS TORQUE CALCULATION CONSTANT | $a_3$ | |
| | ENGINE (INTERNAL/EQUIVALENT) INERTIAL MOMENT | $I_e$ | $kgm^2$ |
| | ENGINE STROKE VOLUME (ENGINE DISPLACEMENT) | $D_i$ | L |
| GEARBOX-RELATED | FIRST GEAR REDUCTION RATIO | $R_{t1}$ | NONE |
| | SECOND GEAR REDUCTION RATIO | $R_{t2}$ | |
| | THIRD GEAR REDUCTION RATIO | $R_{t3}$ | |
| | FOURTH GEAR REDUCTION RATIO | $R_{t4}$ | |
| | FIFTH GEAR REDUCTION RATIO | $R_{t5}$ | |
| | SIXTH GEAR REDUCTION RATIO | $R_{t6}$ | |
| | FINAL REDUCTION RATIO | $R_f$ | |
| | GEARBOX LOSS TORQUE | $T_m$ | Nm |
| | NUMBER OF GEARBOX STAGES | $G_{max}$ | NONE |
| VEHICLE BODY-RELATED | VEHICLE TOTAL WEIGHT | W | N |
| | VEHICLE AIR RESISTANCE | CdA | N |
| | VEHICLE ROLLING RESISTANCE | Dr | |
| | TIRE RADIUS | r | m |
| | TIRE INERTIAL MOMENT | It | $kgm^2$ |
| TABLE DATA | LOW-ROTATION OUTPUT TORQUE COEFFICIENT | $C_0$ | NONE |
| | HIGH-ROTATION OUTPUT TORQUE COEFFICIENT | $C_h$ | |
| | ACCELERATOR FULL-OPEN TORQUE CURVE | $T_{cv}$ | Nm |
| | TORQUE CONVERTER TORQUE CAPACITY COEFFICIENT | $C_c$ | |
| | TRANSMISSION TORQUE RATIO | $C_e$ | |
| AUTOMATIC GEAR SHIFTING-RELATED TABLE DATA | SHIFT-UP BOUNDARY1-2 | U12 | NONE |
| | SHIFT-UP BOUNDARY2-3 | U23 | |
| | SHIFT-UP BOUNDARY3-4 | U34 | |
| | SHIFT-UP BOUNDARY4-5 | U45 | |
| | SHIFT-UP BOUNDARY5-6 | U56 | |
| | SHIFT-DOWN BOUNDARY2-1 | D21 | |
| | SHIFT-DOWN BOUNDARY3-2 | D32 | |
| | SHIFT-DOWN BOUNDARY4-3 | D43 | |
| | SHIFT-DOWN BOUNDARY5-4 | D54 | |
| | SHIFT-DOWN BOUNDARY6-5 | D65 | |

SOUND SIGNAL GENERATION DEVICE, SOUND SIGNAL GENERATION METHOD, AND SOUND SIGNAL GENERATION PROGRAM

TECHNICAL FIELD

The present invention belongs to the technical fields of sound signal generation devices, sound signal generation methods, and sound signal generation programs. More specifically, it belongs to the technical fields of sound signal generation devices and sound signal generation methods for artificially generating a sound signal indicating a sound of an internal combustion engine, and a program for the sound signal generation device. Note that, in the following, the above internal combustion engine is simply referred to as an "engine", and a vehicle on which the internal combustion engine is mounted as a drive source thereof is simply referred to as an "engine vehicle".

BACKGROUND ART

In recent years, research and development regarding so-called electric vehicles (electric automobiles) in which a motor is a part or all of the drive source has been actively carried out. In such an electric vehicle, the motor (electric motor) is mainly used as the drive source, and a conventional engine is not mounted at all or is often merely mounted as an auxiliary for the motor, which is the main drive source. Here, the above electric vehicle includes, for example, electric vehicle (EV), hybrid vehicle (HV), plug-in hybrid vehicle (PHV), fuel cell vehicle (FCV), and the like (including four-wheeled vehicle and two-wheeled vehicle etc.).

On the other hand, with respect to the electric vehicle described above, it is regarded as a problem that a sound generated by the running of the electric vehicle is significantly different from that of the vehicle on which the conventional engine is mounted. That is, for example, in an EV or FCV, the engine sound that can be heard by the passenger in the vehicle is not generated at all, so that the passenger can hear only so-called road noise or wind noise during the running. At this time, the volume of the road noise or the like increases in conjunction with the vehicle running speed, but the volume does not directly respond to an accelerator operation (accelerator opening) in the electric vehicle. Further, in an HV or PHV, there is a state in which a sound is generated from the engine mounted thereon, but this is not always the case, and furthermore the sound is often not associated with the vehicle running speed or the accelerator opening. Thus, in the electric vehicle, the sound of the engine in a state corresponding to the accelerator operation by the passenger is not generated, and as a result, the enjoyment of driving is reduced for passengers who prefer the engine sound. Further, in addition, there have been concerns about safety that the so-called sense of speed is dull due to an engine sound and the risk of erroneous operation of the accelerator or brake pedal increases.

Therefore, in recent years, it has been considered to output an artificial engine sound synthesized by a digital circuit in the vehicle in conjunction with the running of the electric vehicle. Examples of documents disclosing such prior art include Patent Document 1 described below. A running-linked sound producing device disclosed in Patent Document 1 includes a vehicle speed estimating unit for estimating a vehicle speed of the vehicle, an accelerator command value estimating unit for estimating an accelerator command value based on the vehicle speed estimated, and a running-linked sound generating unit for generating a running-linked sound, the running-linked sound generating unit generating the running-linked sound based on the vehicle speed estimated by the vehicle speed estimating unit and the accelerator command value estimated by the accelerator command value estimating unit. At this time, in the prior art such as disclosed in Patent Document 1, the technique itself for synthesizing the sound of the engine with a digital circuit has already been established, but at the time of the synthesis, data respectively indicating the engine rotation speed and the accelerator opening are necessary.

CITATION LIST

Patent Document

Patent Document 1: JP 5646043 B2

DISCLOSURE OF INVENTION

Problems to be Solved by the Invention

However, since there is no engine in EVs and FCVs in the first place, data indicating the rotation speed cannot be obtained, and in HVs and PHVs, there is an engine, but it does not operate in conjunction with the running, and there was a problem that the data indicating the rotation speed cannot be used as it is.

Furthermore, in a conventional engine vehicle on which an engine is mounted, the engine rotation speed changes due to automatic gear shifting, and there was also a problem that when the change in engine rotation speed due to the automatic gear shifting is not simulated, a realistic engine sound could not be generated in the vehicle.

Therefore, the present invention has been made in view of each of the above problems, and one example of the object is to provide a sound signal generation device and sound signal generation method capable of artificially generating a sound signal indicating a realistic engine sound linked to running, for example, even in the case of an electric vehicle on which the engine is not mounted at all, and a program for the sound signal generation device.

Solutions to the Problems

In order to solve the above problems, an invention according to claim 1 is characterized by comprising: an operation amount data acquisition means that acquires operation amount data indicating an accelerator operation amount in an electric vehicle on which an electric motor for vehicle driving is mounted; a running speed data acquisition means that acquires running speed data indicating running speed of the electric vehicle; a virtual running speed calculation means that calculates a virtual running speed of a vehicle on which an engine of an internal combustion type is mounted; a modification means that modifies the calculated virtual running speed on the basis of the acquired running speed data; a virtual rotation speed calculation means that calculates a virtual rotation speed of the engine on the basis of the modified virtual running speed; and a generation means that generates an artificial engine sound signal indicating an artificial sound of the engine corresponding to a running state of the electric vehicle on the basis of the accelerator operation amount indicated by the acquired operation amount data and the calculated virtual rotation speed.

In order to solve the above problems, an invention according to claim 7 is characterized by a sound signal generating method executed in a sound signal generation device comprising an operation amount data acquisition means, a running speed data acquisition means, a virtual running speed calculation means, a modification means, a virtual rotation speed calculation means, and a generation means, the method including: a step of acquiring, by the operation amount data acquisition means, operation amount data indicating an accelerator operation amount in an electric vehicle on which an electric motor for vehicle driving is mounted; a step of acquiring, by the running speed data acquisition means, running speed data indicating running speed of the electric vehicle; a step of calculating, by the virtual running speed calculation means, a virtual running speed of a vehicle on which an engine of an internal combustion type is mounted; a step of modifying, by the modification means, the calculated virtual running speed on the basis of the acquired running speed data; a step of calculating, by the virtual rotation speed calculation means, a virtual rotation speed of the engine on the basis of the modified virtual running speed; and a step of generating, by the generation means, an artificial engine sound signal indicating an artificial sound of the engine corresponding to a running state of the electric vehicle on the basis of the accelerator operation amount indicated by the acquired operation amount data and the calculated virtual rotation speed.

In order to solve the above problems, an invention according to claim 8 is characterized by causing a computer to execute: a step of acquiring operation amount data indicating an accelerator operation amount in an electric vehicle on which an electric motor for vehicle driving is mounted; a step of acquiring running speed data indicating running speed of the electric vehicle; a step of calculating a virtual running speed of a vehicle on which an engine of an internal combustion type is mounted; a step of modifying the calculated virtual running speed on the basis of the acquired running speed data; a step of calculating a virtual rotation speed of the engine on the basis of the modified virtual running speed; and a step of generating an artificial engine sound signal indicating an artificial sound of the engine corresponding to a running state of the electric vehicle on the basis of the accelerator operation amount indicated by the acquired operation amount data and the calculated virtual rotation speed.

According to the invention according to any one of claim 1, 7, or 8, a virtual running speed of a vehicle on which an engine of an internal combustion type is mounted is modified on the basis of running speed data indicating a running speed of an electric vehicle, a virtual rotation speed of the engine is calculated on the basis of the modified virtual running speed, and an artificial engine sound corresponding to a running state of the electric vehicle is generated on the basis of the virtual rotation speed and the corresponding accelerator operation amount. Therefore, for example, even in an electric vehicle on which an engine of an internal combustion type is not mounted, it is possible to artificially generate a realistic engine sound linked to the running of the electric vehicle.

In order to solve the above problems, an invention according to claim 2 is characterized by the sound signal generation device according to claim 1, wherein the operation amount data acquisition means acquires the operation amount data at each preset operation amount data acquisition cycle, the running speed data acquisition means acquires the running speed data at each preset running speed data acquisition cycle, and the modification means modifies the virtual running speed at each preset modification cycle.

According to the invention according to claim 2, in addition to the working of the invention according to claim 1, since the acquisition of the operation amount data, the acquisition of the running speed data, and the modification of the virtual running speed are performed for each prescribed cycle, it is possible to artificially generate an engine sound with high accuracy.

In order to solve the above problems, an invention according to claim 3 is characterized by the sound signal generation device according to claim 1 or 2, wherein the virtual rotation speed calculation means calculates the virtual rotation speed by using at least the modified virtual running speed and a gear ratio based on an automatic gear shifting diagram preset corresponding to the engine.

According to the invention according to claim 3, in addition to the working of the invention according to claim 1 or 2, the virtual rotation speed is calculated by using at least the modified virtual running speed and a gear ratio based on a prescribed automatic gear shifting diagram, and it is possible to artificially generate a realistic engine sound while reducing the processing load.

In order to solve the above problems, an invention according to claim 4 is characterized by the sound signal generation device according to any one of claims 1 to 3, wherein the virtual running speed calculation means calculates the virtual running speed by excluding an influence of gradient of a road on which the electric vehicle moves and an influence of braking resistance of the electric vehicle.

According to the invention according to claim 4, in addition to the working of the invention according to any one of claims 1 to 3, since the virtual running speed is calculated by excluding the influence of a road gradient and the influence of braking resistance that are negligible when generating an artificial engine sound, the influence of the negligible factors are excluded, and it is possible to artificially generate an engine sound while further reducing the processing burden.

In order to solve the above problems, an invention according to claim 5 is characterized by the sound signal generation device according to any one of claims 1 to 4, wherein the virtual running speed calculation means calculates the virtual running speed on the basis of a relationship between a rotation speed of the engine and an output torque as the engine, and the output torque is calculated on the basis of the accelerator operation amount indicated by the acquired operation amount data and an output torque coefficient corresponding to the accelerator operation amount.

According to the invention according to claim 5, in addition to the working of the invention according to any one of claims 1 to 4, the virtual running speed is calculated on the basis of the relationship between the rotation speed of the engine and an output torque, and furthermore the output torque is calculated on the basis of an accelerator operation amount and an output torque coefficient, and it is possible to artificially generate a more realistic engine sound.

In order to solve the above problems, an invention according to claim 6 is characterized by the sound signal generation device according to any one of claims 1 to 5, wherein the modification means modifies the virtual running speed at a timing later than a timing of acquisition of the running speed data by using the acquired running speed data.

According to the invention according to claim 6, in addition to the working of the invention according to any one of claims 1 to 5, the running speed data is used to modify the virtual running speed at a timing later than a timing of acquisition of the running speed data, and the virtual running speed can be modified while preventing the modified virtual running speed from suddenly (that is, unnaturally) changing due to the modification.

Effects of the Invention

According to the present invention, even in an electric vehicle, for example, on which an engine of an internal combustion type is not mounted, it is possible to artificially generate a realistic engine sound linked to the running of the electric vehicle.

BRIEF DESCRIPTION OF THE DRAWINGS

FIG. 2 is a figure exemplifying the content of variable data of the present embodiment.

FIG. 3 is a figure exemplifying the content of vehicle data of the present embodiment.

FIG. 5 is a figure exemplifying a change in torque of the present embodiment.

EMBODIMENTS FOR CARRYING OUT THE INVENTION

Next, a mode for carrying out the present invention will be described with reference to FIGS. 1 to 10. Note that the embodiment described below is an embodiment in a case where the present invention is applied to sound signal generation processing for artificially outputting a sound of an internal combustion engine corresponding to the operation of the driver of the electric vehicle, the vehicle running speed of the electric vehicle, or the like in the electric vehicle.

Figure 1:
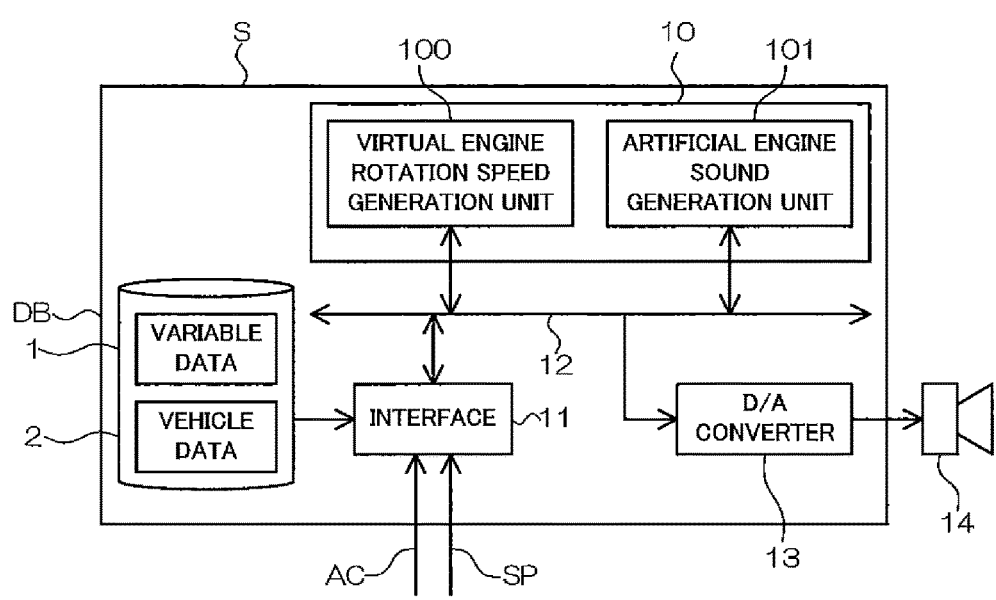
FIG. 1 is a block figure illustrating an outline configuration of a sound signal generation device of the present embodiment.
Figure 4:
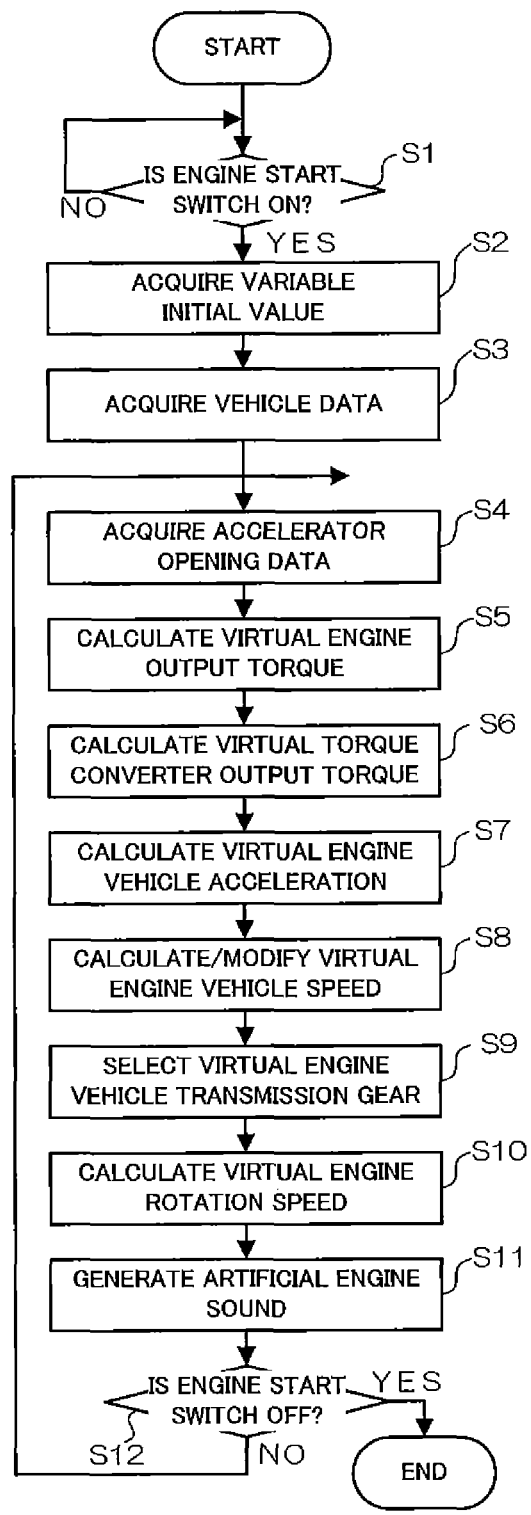
FIG. 4 is a flowchart illustrating sound signal generation processing of the present embodiment.
Figure 5A:
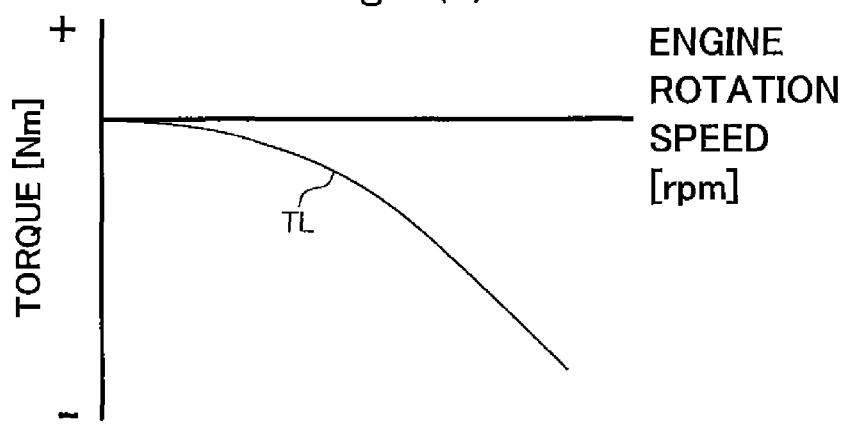
FIG. 5(a) is a figure exemplifying a relationship between an engine rotation speed and an engine internal loss torque of the present embodiment.
Figure 5B:
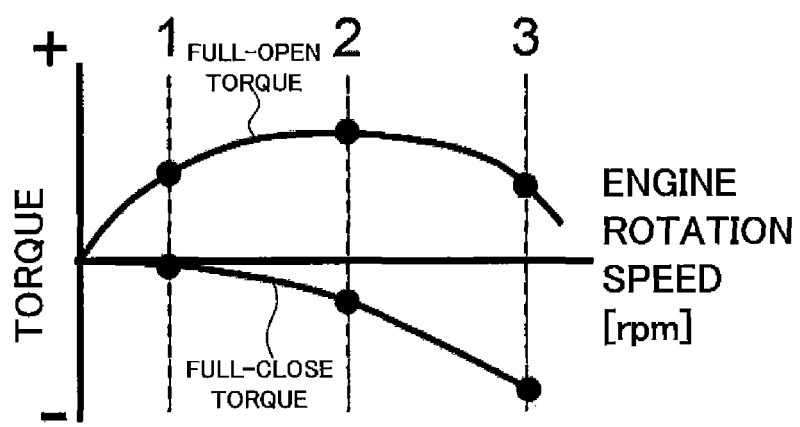
FIG. 5(b) is a figure exemplifying a relationship between an engine rotation speed and various torques of the present embodiment.
Figure 5C:
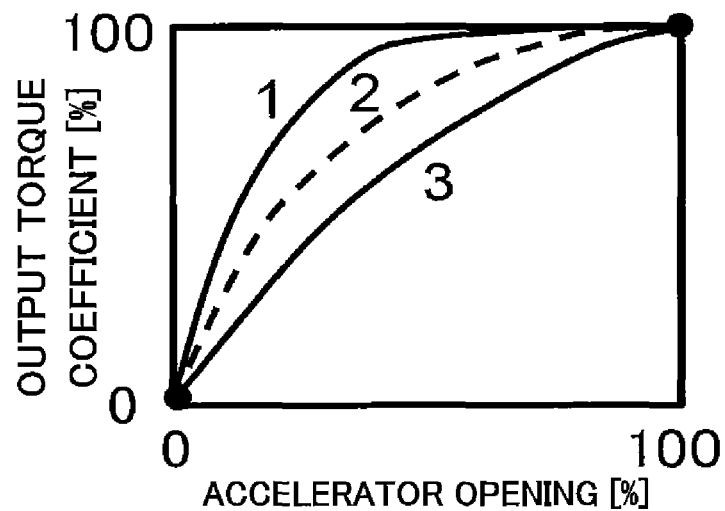
FIG. 5(c) is a figure exemplifying a relationship between an accelerator opening and an output torque coefficient of the present embodiment.
Figure 6:
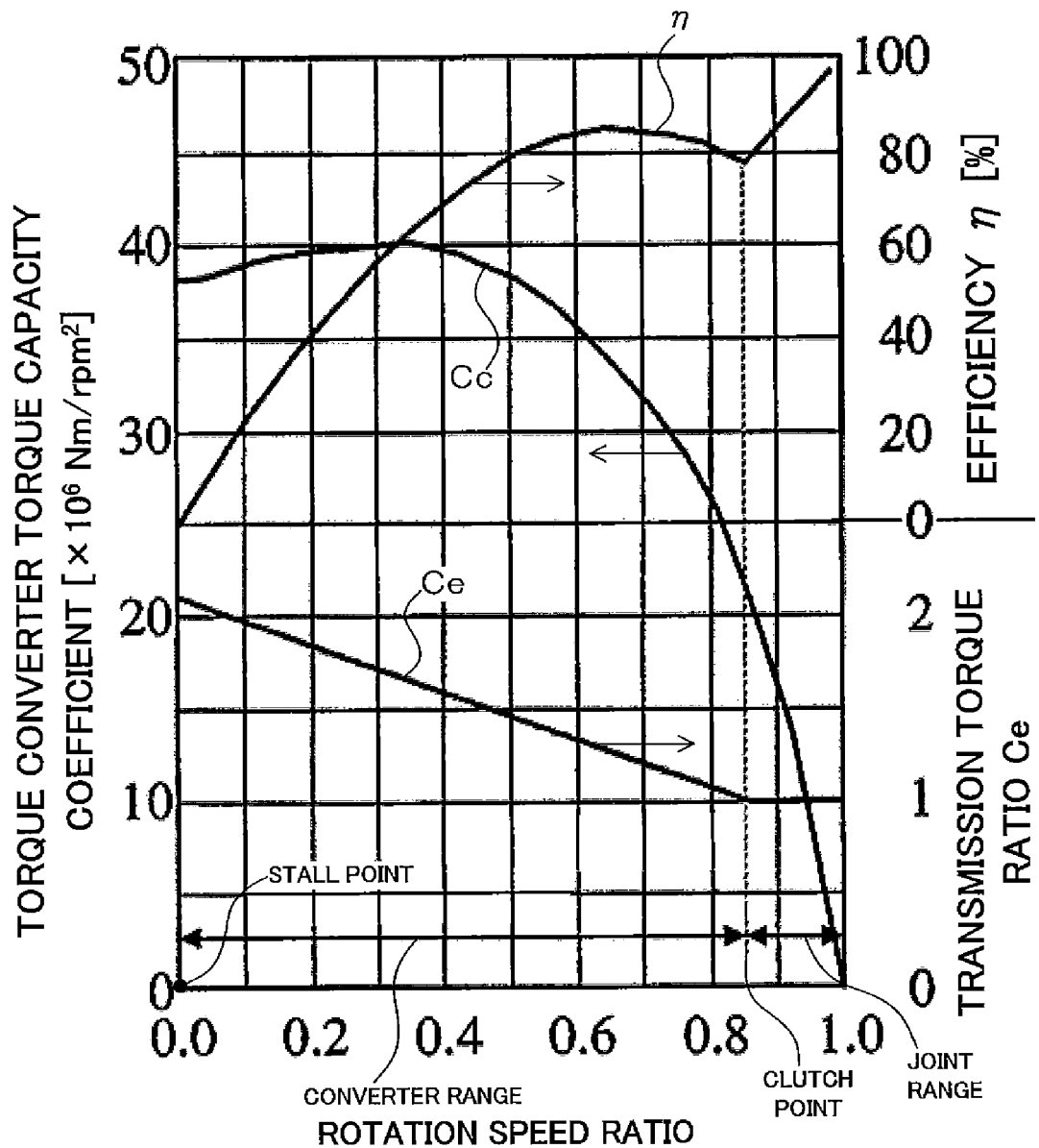
FIG. 6 is a figure exemplifying a relationship or the like between a speed ratio and a torque ratio of the present embodiment.
Figure 7:
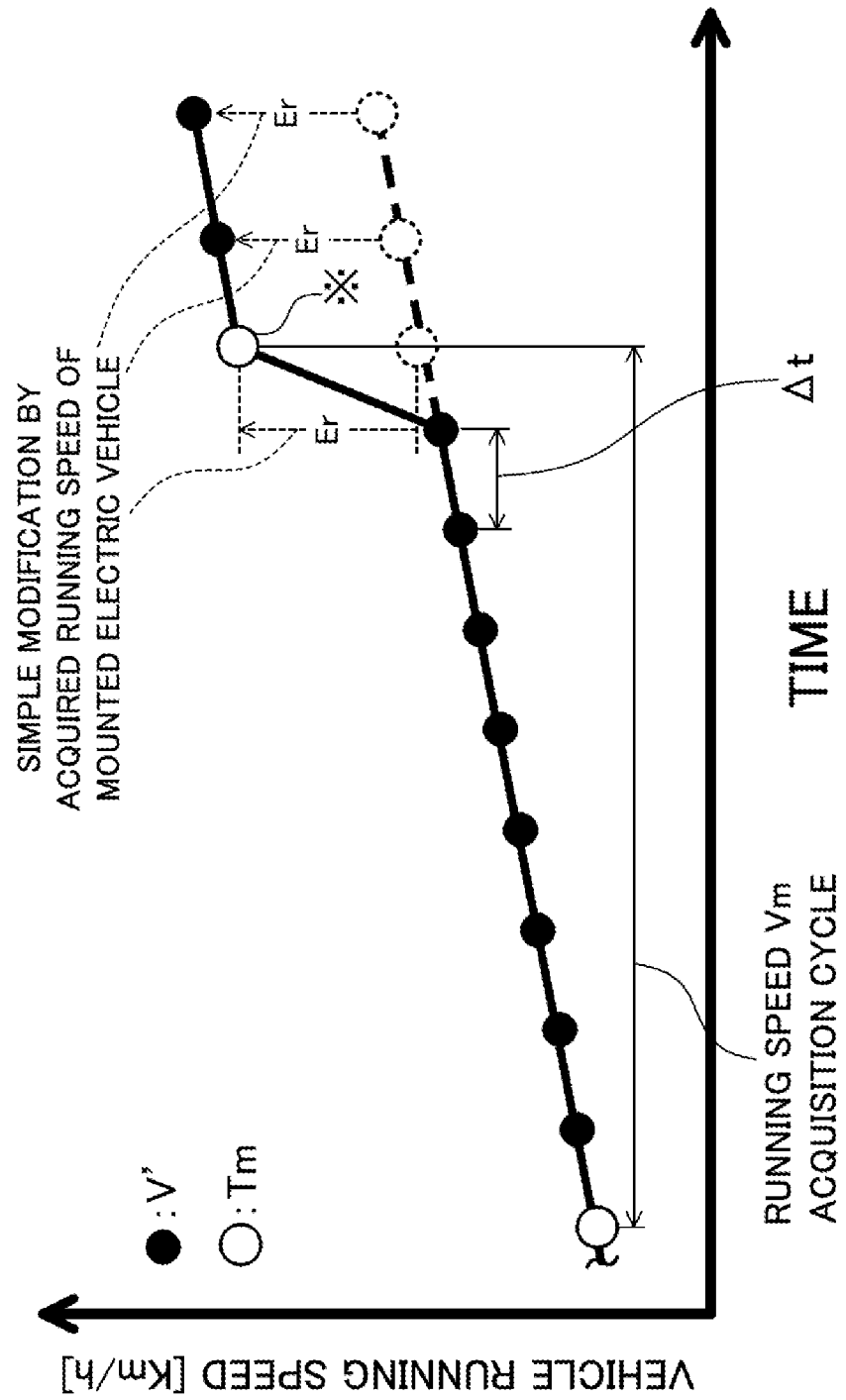
FIG. 7 is a figure exemplifying modification of a virtual engine vehicle speed of the present embodiment.
Figure 8:
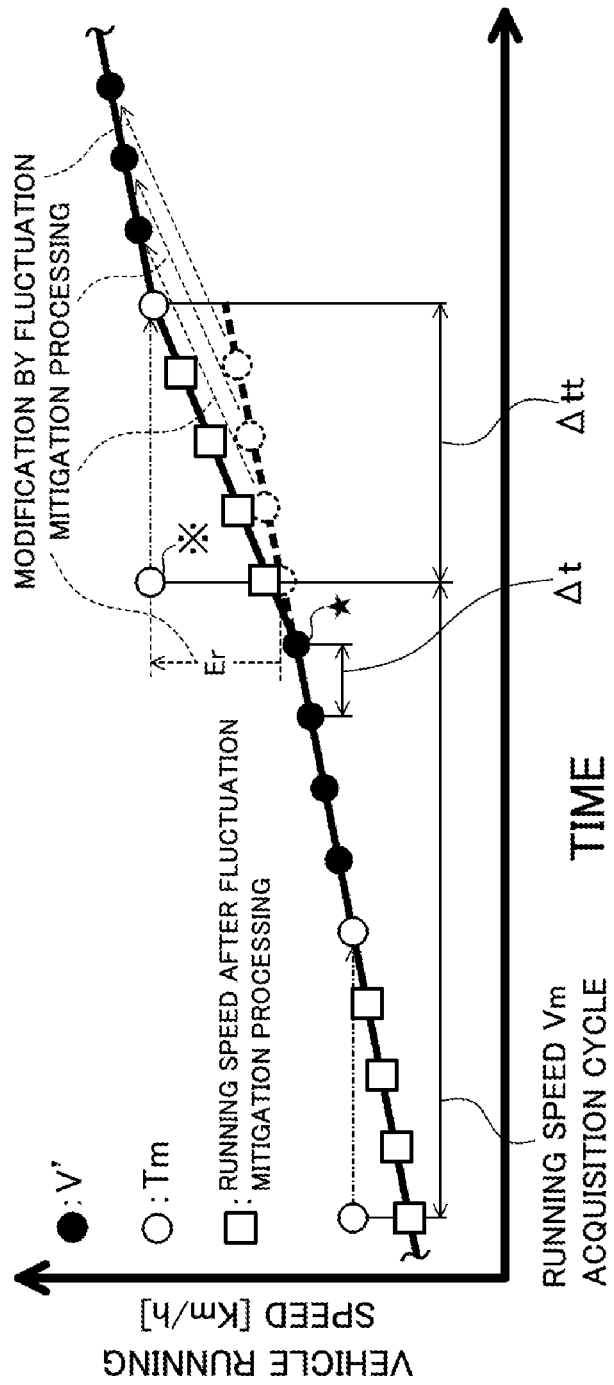
FIG. 8 is a figure exemplifying modification of a virtual engine vehicle speed of the present embodiment including fluctuation mitigation processing.
Figure 9:
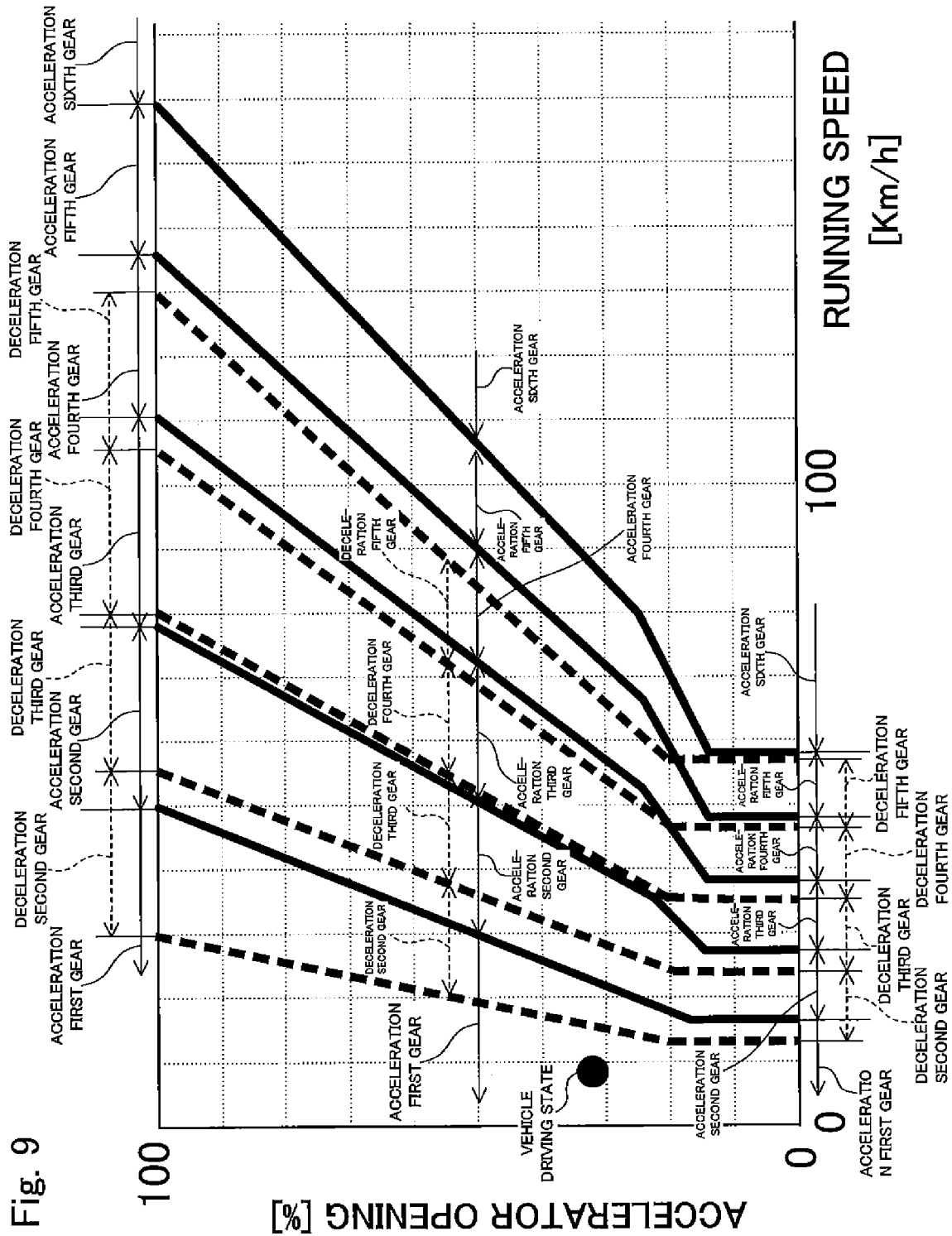
FIG. 9 is a figure exemplifying automatic gear shifting control of the present embodiment.
Figure 10:
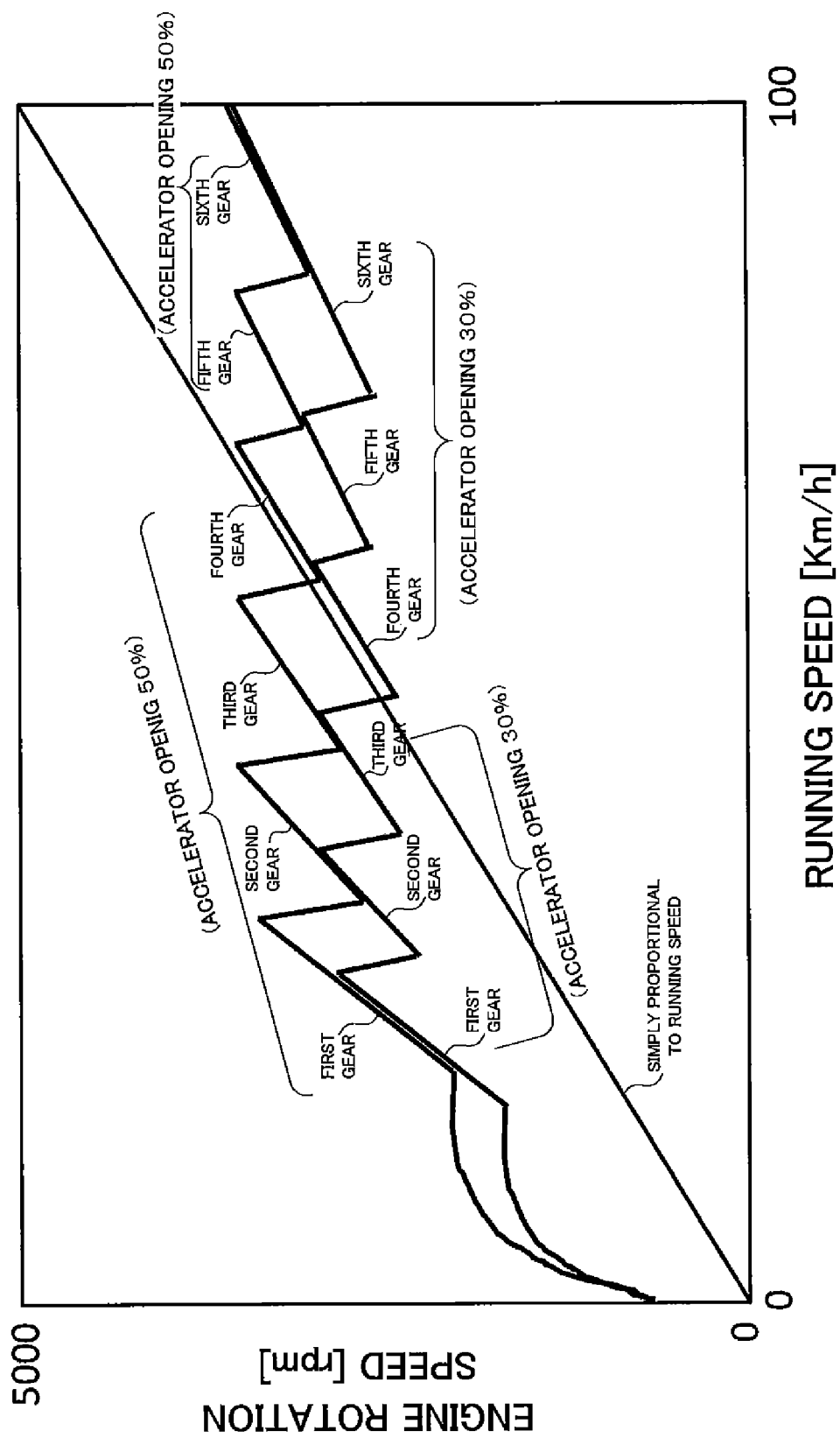
FIG. 10 is a figure exemplifying a relationship between a vehicle running speed of an electric vehicle and an engine rotation speed of a virtual engine vehicle corresponding to the electric vehicle of the present embodiment.

Further, FIG. 1 is a block figure illustrating an outline configuration of a sound signal generation device of the present embodiment, FIG. 2 is a figure exemplifying the content of variable data of the present embodiment, and FIG. 3 is a figure exemplifying the content of vehicle data of the present embodiment. Furthermore, FIG. 4 is a flowchart illustrating sound signal generation processing of the present embodiment, FIG. 5 is a figure exemplifying a change in torque or the like of the present embodiment, and FIG. 6 is a figure exemplifying a relationship or the like between a speed ratio and a torque ratio of the present embodiment. Furthermore, further, FIG. 7 is a figure exemplifying modification of a virtual engine vehicle speed of the present embodiment, FIG. 8 is a figure exemplifying modification of a virtual engine vehicle speed of the present embodiment including fluctuation mitigation processing, FIG. 9 is a figure exemplifying automatic gear shifting control of the present embodiment, and FIG. 10 is a figure exemplifying a relationship between a vehicle running speed of an electric vehicle and an engine rotation speed of a virtual engine vehicle corresponding to the electric vehicle of the present embodiment.

The sound signal generation device of the present embodiment described below is itself mounted on the above electric vehicle, and generates a sound signal for artificially outputting in the electric vehicle a sound of a virtual engine corresponding to the operation of the driver of the electric vehicle, the vehicle running speed of the electric vehicle, or the like (that is, a virtual internal combustion engine that is not actually mounted on the electric vehicle). Note that, in the following description, the above virtual internal combustion engine is simply referred to as a "virtual engine", and a virtual vehicle on which the virtual engine is mounted (that is, a virtual vehicle on which a virtual engine is mounted, which is not an electric vehicle) is simply referred to as a "virtual engine vehicle". Further, the above electric vehicle on which the sound signal generation device of the present embodiment is mounted is simply referred to as a "mounted electric vehicle". Then, in the sound signal generation device of the present embodiment, after setting a vehicle physical model in which the virtual engine vehicle including the above virtual engine is artificially reproduced (simulated), the sound of the above virtual engine is artificially output in the mounted electric vehicle.

As illustrated in FIG. 1, a sound signal generation device S of the present embodiment is connected to a speaker 14 provided in the vehicle of the above mounted electric vehicle. Then, the sound signal generation device S comprises a database DB recorded in a non-volatile recording medium such as a hard disc drive (HDD) or solid state drive (SSD), a processing unit 10 comprising a central processing unit (CPU), and a read-only memory (ROM), a random-access memory (RAM), and the like, an interface 11, and a digital/analog (D/A) converter 13 connected to the speaker 14. Further, the processing unit 10 includes a virtual engine rotation speed generation unit 100 and an artificial engine sound generation unit 101. Furthermore, the above virtual engine rotation speed generation unit 100, the above artificial engine sound generation unit 101, the above interface 11, and the above D/A converter 13 are connected so that data or information and a sound signal can be exchanged via a bus 12. Here, the above virtual engine rotation speed generation unit 100 and the above artificial engine sound generation unit 101 may be realized by a hardware logic circuit such as a CPU constituting the processing unit 10, or may be realized by software when the processing unit 10 reads and executes a program corresponding to a flowchart illustrating the sound signal generation processing of the present embodiment described below. Furthermore, the above interface 11 corresponds to an example of the "operation amount data acquisition means" and an example of the "running speed data acquisition means" of the present invention respectively, the above virtual engine rotation speed generation unit 100 corresponds to an example of the "virtual running speed calculation means", an example of the "modification means", and an example of the "virtual rotation speed calculation means" of the present invention respectively, and the above artificial engine sound generation unit 101 corresponds to an example of the "generation means" of the present invention.

In the above configuration, variable data 1 of the present embodiment and vehicle data 2 of the present embodiment are non-volatilely recorded in the database DB.

Here, as the variable data 1 of the present embodiment, as illustrated in FIG. 2, a plurality of variables used for the sound signal generation processing by the sound signal generation device S of the present embodiment and initial values of the respective variables are associated and non-volatilely recorded in the database DB. Note that FIG. 2 also illustrates signs and units thereof used when expressing each of the above variables in each formula and the like described below used in the above sound signal generation processing. At this time, in FIG. 2, each variable included in the "virtual engine vehicle-related" box excluding "engine start switch" is a virtual variable indicating the driving state of the virtual engine or the virtual engine vehicle, and their initial values are "0" or "0.0" unless the case in which a gear shifting diagram selection value (transmission gear value) is "1". On the other hand, the vehicle running speed in the "electric vehicle-related" box is a variable indicating the actual vehicle running speed of the mounted electric vehicle. Further, the above engine start switch is a variable indicating a state of an engine start switch, which is not illustrated, provided in the mounted electric vehicle (that is, a state as to whether an operation of starting or stopping the motor, which is the drive source, provided in the mounted electric vehicle has been performed). More specifically, when the above engine start switch provided in the mounted electric vehicle is turned on, the value of an engine start switch Ssw becomes, for example, "1", and when the engine start switch is turned off, the value of the engine start switch Ssw is, for example, "0". Furthermore, a lockup status Lu is a variable indicating a lockup state of a torque converter, which will be described below.

On the other hand, as the vehicle data 2 of the present embodiment, as illustrated in FIG. 3, a plurality of pieces of data that is preset and indicates specifications or the like of a virtual engine or a virtual engine vehicle in which a sound signal indicating the engine sound is generated by the sound signal generation device S of the present embodiment is non-volatilely recorded in the database DB. Note that FIG. 3 also illustrates signs and units thereof used when expressing each of the above data in each formula and the like described below used in the above sound signal generation processing. At this time, in FIG. 3, each data included in the "engine-related" box, the "gearbox-related" box, the "table data" box, and the "automatic gear shifting-related table data" box is data that is preset and recorded to indicate the driving state of the virtual engine or the virtual engine vehicle. On the other hand, each data included in the "vehicle body-related" box indicates the specifications of the virtual engine vehicle, but these may correspond respectively to the actual specifications of the mounted electric vehicle. Further, regarding a shift-up boundary and a shift-down boundary in the automatic gear shifting-related table data, for example, "shift-up boundary 1-2" indicates the boundary when the transmission shifts up from the first gear to the second gear, and "shift-down boundary 2-1" indicates the boundary when shifting down from the second gear to the first gear. Furthermore, the number of gearbox stages Gmax is data indicating (the maximum value of) the number of gearbox stages as a virtual engine vehicle.

In the above configuration, to the interface 11, the variable data 1 and the vehicle data 2, accelerator opening data AC indicating the opening when the accelerator provided in the mounted electric vehicle is operated by the driver of the mounted electric vehicle, and running speed data SP indicating the actual vehicle running speed of the mounted electric vehicle are input. At this time, the variable data 1 and the vehicle data 2 are input from the database DB when the sound signal processing of the present embodiment is started, and are output to the processing unit 10 via the bus 12. On the other hand, the accelerator opening data AC and the running speed data SP are input in real time in parallel with the running of the mounted electric vehicle.

Here, the accelerator opening data AC is data indicating the opening of the above accelerator (accelerator provided in the mounted electric vehicle) detected by the same method as the conventional method. Further, the running speed data SP is, for example, data indicating the above vehicle running speed (actual vehicle running speed of the mounted electric vehicle) calculated by counting pulse signals generated according to the rotation speed of the tires of the mounted electric vehicle. Then, the accelerator opening data AC is input to the processing unit 10 via the bus 12, and the accelerator opening indicated by the accelerator opening data AC is reflected in accelerator opening Ap (see FIG. 2) as a variable. Further, the running speed data SP is also input to the processing unit 10 via the bus 12, and the vehicle running speed indicated by the running speed data SP is reflected in vehicle running speed Vm of the electric vehicle (see FIG. 2) as a variable. Thus, the virtual engine rotation speed generation unit 100 of the processing unit 10 generates rotation speed data in real time indicating rotation speed N', which is the rotation speed as a virtual engine, corresponding to the operation by the above driver, the vehicle running speed of the mounted electric vehicle, or the like on the basis of the above accelerator opening Ap, the above vehicle running speed Vm, and other pieces of the variable data 1 and vehicle data 2, and outputs the data to the artificial engine sound generation unit 101 of the processing unit 10 via the bus 12. At this time, the above cycle of generation (cycle of calculation) of the rotation speed data is set to be a sufficiently short time (for example, about 10 milliseconds to 20 milliseconds as described below) so that a person (passenger) cannot perceive the interval as described below as "calculation cycle time $\Delta t$". Thus, it is possible to react instantly to the above accelerator operation, and it is possible to reflect even a slight change in rotation speed of the virtual engine in the calculation result, and therefore, it is possible to generate the rotation speed data in which the change in rotation speed of the virtual engine is smoothly expressed.

Next, the artificial engine sound generation unit 101 artificially generates a sound signal corresponding to the sound of the virtual engine by, for example, the same method as the conventional method on the basis of the above rotation speed data output from the virtual engine rotation speed generation unit 100 and the accelerator opening Ap indicated by the accelerator opening data AC, and outputs the sound signal to the D/A converter 13 via the bus 12. Then, the D/A converter 13 converts the sound signal into analog and outputs the sound signal, which is an analog signal, to the speaker 14. Thus, the sound signal, which is an analog signal, is output in real time as the sound of the virtual engine into the vehicle of the electric vehicle via the speaker 14.

By the functions of the virtual engine rotation speed generation unit 100 and the artificial engine sound generation unit 101 as described above, it is possible to simulate in the mounted electric vehicle the running state of a so-called hydraulic automatic transmission (AT) vehicle in which the virtual engine turns in a so-called idling state when the vehicle is stopped and the rotation speed increases prior to an increase in vehicle running speed when the vehicle starts. At this time, also regarding so-called gear shifting control, as will be described below (see FIG. 9), the gear shifting control of the actual engine vehicle (gear shifting control that selects the transmission gear from the accelerator opening and the vehicle running speed) is simulated, so that the same gear shifting as in the actual engine vehicle is performed and the rotation speed of the virtual engine changes accordingly.

Here, the rotation speed of the virtual engine when the mounted electric vehicle is running is calculated from the vehicle running speed as the virtual engine vehicle, a drive system reduction ratio, a tire outer diameter, and the like. Here, in a case where an error occurs between the vehicle running speed calculated as the virtual engine vehicle and the actual vehicle running speed as the mounted electric vehicle due to, for example, a difference in torque characteristics or the influence of a road gradient, this error is modified by periodically acquiring data indicating the vehicle running speed of the mounted electric vehicle. At this time, in a case where the vehicle running speed as the mounted electric vehicle is replaced with the vehicle running speed calculated as the virtual engine vehicle as it is, and in a case where there is a gap deviation, the vehicle running speed becomes discontinuous and a sense of discomfort occurs regarding the engine sound, and therefore, as will be described below, the fluctuation mitigation processing of the present embodiment for mitigating a sudden change in vehicle running speed is performed.

Next, the sound signal generation processing of the present embodiment will be specifically described. The sound signal generation processing of the present embodiment is started when the passenger rides in the mounted electric vehicle and, for example, so-called ACC (accessory) switch of the mounted electric vehicle is turned on. The sound signal generation processing of the present embodiment is sound signal generation processing using a vehicle physical model of the above virtual engine vehicle. Then, as the corresponding flowchart is illustrated in FIG. 4, when the sound signal generation processing of the present embodiment is started, the processing unit 10 first monitors as to whether the above engine start switch provided in the mounted electric vehicle has been turned on on the basis of the value of the engine start switch Ssw, which is a variable (see FIG. 2) that reflects the state of the engine start switch (step S1, step S1: NO). In the monitoring of step S1, when the above engine start switch is turned on (step S1: YES), next the virtual engine rotation speed generation unit 100 of the processing unit 10 acquires an initial value of each variable included in the variable data 1 from the database DB via the bus 12 (step S2) and acquires each data included in the vehicle data 2 from the database DB via the bus 12 (step S3). The variable data 1 and the vehicle data 2 acquired in above steps S2 and S3, respectively, are temporarily recorded in a RAM or the like, which is not illustrated, constituting the processing unit 10.

Next, the virtual engine rotation speed generation unit 100 acquires the above accelerator opening data AC via, for example, a controller area network (CAN) of the mounted electric vehicle and reflects the data in the accelerator opening Ap in the variable data 1 (step S4).

Here, steps S4 to S12 in the sound signal processing of the present embodiment are, as will be described below, repeated in a cycle of a calculation cycle time Δt of, for example, 10 milliseconds to 20 milliseconds, but the cycle of acquisition of the accelerator opening data AC in above step S4 is preferably, for example, every 100 milliseconds to 200 milliseconds. That is, it is desirable that the cycle of acquisition of the accelerator opening data AC itself is essentially as short as possible, but since the hardware and software as the electrical components differ depending on the type of the mounted electric vehicle, it is not desirable to strictly preset the cycle of acquisition from the viewpoint of versatility or the like. On the other hand, since the accelerator itself of the mounted electric vehicle is directly operated by the driver who is the passenger, the opening does not change significantly in a very short time (for example, several milliseconds to several tens of milliseconds). Therefore, as described above, for example, even when the accelerator opening data AC is acquired every 100 milliseconds to 200 milliseconds, it is possible to almost accurately simulate the virtual engine or the virtual engine vehicle as the sound signal processing of the present embodiment. Further, for example, when the cycle is every 100 milliseconds to 200 milliseconds, it is possible to acquire the accelerator opening data AC from the CAN of almost all mounted electric vehicles.

After the accelerator opening data AC is acquired in step S4, next, the virtual engine rotation speed generation unit 100 virtually calculates an output torque or the like of the virtual engine (steps S5 and S6) corresponding to the accelerator opening Ap corresponding to the acquired accelerator opening data AC, virtually obtains the running state of the virtual engine vehicle (steps S7 to S9), and furthermore virtually calculates the rotation speed of the virtual engine (step S10).

That is, when the accelerator opening data AC is acquired in step S4, next the virtual engine rotation speed generation unit 100 calculates the output torque of the virtual engine on the basis of the accelerator opening Ap corresponding to the acquired accelerator opening data AC (step S5).

More specifically, the virtual engine rotation speed generation unit 100 first calculates the engine internal loss torque as the virtual engine at an arbitrary engine rotation speed of the virtual engine (virtual engine rotation speed). This engine internal loss torque is the engine torque (full-close torque) of the virtual engine when the accelerator is fully closed, is the force that is the basis of the so-called engine brake for the virtual engine, and has a negative value. The virtual engine rotation speed generation unit 100 calculates the engine internal loss torque by Formula (1) described below. Note that, in Formula (1) below, "TL (negative value)" is the engine internal loss torque (see FIG. 2) as the variable data 1, "N" is the engine rotation speed (see FIG. 2) as the variable data 1, "Di" is the engine displacement preset and recorded as the vehicle data 2, "Cf" is the engine internal loss torque coefficient preset and recorded as the vehicle data 2, and "$a_1$" to "$a_3$" are engine internal loss torque calculation constants preset and recorded as the vehicle data 2.

$$TL = -\{(a_1 \times N^2 + a_2 \times N + a_3) \times (Di/1000)\}/4/\pi \times Cf \qquad (1)$$

At this time, the engine internal loss torque TL changes according to the above engine rotation speed N, for example, as illustrated in FIG. 5(*a*). Here, the engine internal loss torque TL is basically determined by the engine rotation speed N and the engine displacement Di, but varies depending on the type of the virtual engine (that is, the type of the virtual engine indicated by the vehicle data 2 illustrated in FIG. 3). Therefore, in the calculation of the engine internal loss torque TL indicated by Formula (1) above, the difference is adjusted by the above engine internal loss torque calculation constant $a_1$ to the engine internal loss torque calculation constant $a_3$ corresponding to, for example, the reduction time of the engine rotation speed N by revving.

Next, the virtual engine rotation speed generation unit 100 calculates the output torque of the virtual engine using the calculated engine internal loss torque TL. Here, in general, the engine output torque at a certain engine rotation speed N is a value between the full-open torque value obtained from the torque curve and the maximum torque when the accelerator is fully open and the value of the engine internal loss torque TL (that is, the torque when the accelerator is fully closed), and is determined by the accelerator opening Ap. Then, as illustrated in FIG. 5(b), the above full-open torque value is given as an accelerator full-open torque curve Tcv and an engine maximum torque Tmax preset and recorded as the vehicle data 2 (see FIG. 3), and furthermore the engine internal loss torque TL is calculated by Formula (1) described above.

Here, the output torque coefficient when the accelerator is partially opened (that is, the ratio of the output torque when the torque when the accelerator is fully opened is 100) changes depending on the engine rotation speed N. At this time, the accelerator opening and the output torque do not have a linear relationship, and when the horizontal axis is accelerator opening and the vertical axis is output torque coefficient, a curve graph protruding upward as illustrated in FIG. 5(c) is obtained. Furthermore, the curvature of the curve changes depending on the engine rotation speed N, as illustrated by symbols "1", "2", and "3" in FIGS. 5(b) and 5(c). Therefore, in the calculation of the output torque of the present embodiment, curves of the output torque coefficients at low rotation and high rotation (low-rotation output torque coefficient C0 and high-rotation output torque coefficient Ch as the variable data 1 (respectively see FIG. 2)) are preset, and the output torque corresponding to the engine rotation speed N between them is an intermediate value between the output torque corresponding to the low-rotation output torque coefficient C0 and the output torque corresponding to the high-rotation output torque coefficient Ch. In this way, when the curves of the above two output torque coefficients are preset, an estimated value of the output torque coefficient at an arbitrary accelerator opening at an arbitrary engine rotation speed N (estimated output torque coefficient Cot (see FIG. 2) as the variable data 1) can be calculated (see Formula (3) described below), and furthermore an output torque Te of the virtual engine at an arbitrary accelerator opening Ap can be calculated using the estimated output torque coefficient Cot.

More specifically, the virtual engine rotation speed generation unit 100 calculates a normalized engine rotation speed Nn (see FIG. 2) that is a normalized engine rotation speed N as the variable data 1 by Formula (2) described below. Note that, in Formula (2) described below, "Nmax" is the engine rotation speed upper limit (see FIG. 3) preset and recorded as the vehicle data 2.

$$Nn=(N/Nmax)\times 100 \qquad (2)$$

Then, the virtual engine rotation speed generation unit 100 applies the calculated normalized engine rotation speed Nn to the accelerator full-open torque curve Tcv (see FIG. 3) preset and recorded as the vehicle data 2, and obtains an engine full-open torque coefficient Tw (see FIG. 2) as the variable data 1 of the normalized engine rotation speed Nn. Then, the virtual engine rotation speed generation unit 100 respectively applies the accelerator opening Ap corresponding to the accelerator opening data AC acquired in step S4 to the table data of the low-rotation output torque coefficient C0 and the table data of the high-rotation output torque coefficient Ch (see FIG. 3) preset and recorded as the vehicle data 2, and obtains the low-rotation output torque coefficient C0 and the high-rotation output torque coefficient Ch (respectively see FIG. 2) as the corresponding variable data 1. Thus, the virtual engine rotation speed generation unit 100 calculates the above estimated output torque coefficient Cot (see FIG. 2) as the variable data 1 using Formula (3) described below.

$$Cot=[\{-TL/(Tw\times Tmax/100)\}+1]\times[\{(Nn/100)\times Ch+(1-Nn/100)\times C0\}/100-1]+1 \qquad (3)$$

Then, the virtual engine rotation speed generation unit 100 calculates the output torque Te of the virtual engine at an arbitrary accelerator opening Ap as the variable data 1 using Formula (4) described below (step S5).

$$Te=Tw/100\times Tmax Cot \qquad (4)$$

Next, the virtual engine rotation speed generation unit 100 applies the output torque Te of the virtual engine calculated in step S5 to a virtual torque converter corresponding to the virtual engine vehicle (that is, a virtual torque converter not mounted on the mounted electric vehicle) and calculates the output torque of the virtual torque converter (step S6). Note that, in the following description, the above virtual torque converter corresponding to the virtual engine vehicle is simply referred to as a "virtual torque converter".

Here, the torque converter is a component for transmitting the output of the engine to the transmission (gearbox). Further, the torque transmitted by the torque converter is usually determined by the rotation speed ratio between the shaft on the input side and the shaft on the output side of the torque converter. Specifically, a transmission torque ratio Ce (see FIG. 3) is determined by the line (preset and recorded as the vehicle data 2) indicating the relationship between the transmission torque ratio Ce and the rotation speed ratio illustrated in FIG. 6, and a torque converter output torque To is calculated by multiplying the input engine output torque (that is, torque converter input torque Tin) by the transmission torque ratio Ce. At this time, the maximum value of the transmission torque Ce is generally about 2, as illustrated in FIG. 6, and the torque converter output torque To is about twice the torque converter input torque Tin (see FIG. 2) when the engine vehicle starts (that is, when the rotation speed ratio is 0).

More specifically, in a general torque converter, the engine torque (that is, the torque converter input torque Tin) input from the input shaft is output as the torque converter output torque To from the output-side shaft, but the torque converter output torque To in this case is calculated by Formula (5) described below.

$$To=Tin\times Ce \qquad (5)$$

Here, not all torque from the engine is input to the torque converter. That is, in the torque converter, since oil is generally stirred to transmit the power, the torque that can be input is small when the engine rotation speed is low, and as the rotation speed increases, the torque input to the torque converter increases in proportion to the square of the engine rotation speed. Further, the upper limit value of the torque that can be input from the engine to the torque converter (torque converter torque capacity Tc (see FIG. 2) as the variable data 1) is determined by the size of the torque converter, but the torque converter torque capacity Tc also changes depending on the rotation speed ratio. At this time, the torque converter torque capacity Tc is preset (see FIG. 3) as the vehicle data 2, and, as indicated in Formula (6) described below, has a value obtained by multiplying a torque converter torque capacity coefficient Cc (see FIG. 3) that changes as illustrated in FIG. 6 according to the rotation speed ratio (preset and recorded as the vehicle data 2) by the square of the engine rotation speed N. The torque converter torque capacity coefficient Cc varies depending on the size of the torque converter itself.

$$Tc = Cc \times (N/1000)^2 \qquad (6)$$

Then, the torque converter generally has a state in which the input shaft and the output shaft of the torque converter are mechanically coupled by a lockup clutch (lockup state) and a non-lockup state, and in the case of the non-lockup state (indicated as "converter range" in FIG. 6), the torque converter input torque Tin input from the engine to the torque converter is calculated as indicated by Formula (7) described below with each of the values of the output torque Te of the virtual engine calculated in step S5 and the torque converter torque capacity Tc being used as conditions.

In the case where $Te \geq 0$ (when accelerating): $Tin = Te$
(when $Te < Tc$) or $Tin = Tc$ (when $Te \geq Tc$)

In the case where $Te < 0$ (when decelerating):
$$Tin = Te/4 \qquad (7)$$

On the other hand, when the rotation speed ratio approaches 1, a lockup state (indicated as "joint range" in FIG. 6) is provided, and in this lockup state, the output torque from the torque converter becomes equal to the output torque from the engine, and the engine rotation speed N is equal to the rotation speed of the output shaft (drive system shaft) of the torque converter (torque converter output shaft rotation speed No (see FIG. 2)).

More specifically, in recent torque converters, in order to improve fuel efficiency or the like, the lockup clutch is activated when the rotation speed ratio is increased, and the input shaft and output shaft of the torque converter are mechanically coupled. In the engine having the characteristics illustrated in FIG. 6, the lockup state is reached near a rotation speed ratio of 0.85 (indicated as "clutch point" in FIG. 6). Then, in the lockup state, a torque converter input shaft rotation speed Ne (see FIG. 2) and the torque converter output shaft rotation speed No are equal, and the transmission torque ratio Ce is 1, so that the torque converter input torque Tin and the torque converter output torque To are also equal. Further, when the torque converter is in the lockup state, the input shaft and the output shaft are mechanically coupled instead of stir of the oil, so all the output torque Te of the virtual engine input to the torque converter (that is, the torque converter input torque Tin=the output torque Te). Note that in a case where the accelerator of the engine vehicle is closed and the vehicle is decelerated, the torque transmission direction is reversed, and the torque is transmitted from the vehicle drive system of the engine vehicle to the engine side. Then, the change in transmission torque ratio Ce in this case is different from that at the time of acceleration, but the basic calculation method is the same as at the time of acceleration.

Since the torque converter output torque To of the virtual engine vehicle has been calculated in step S6 above, next the virtual engine rotation speed generation unit 100 calculates the driving force of the virtual engine vehicle by the tires (in other words, acceleration in the front-rear direction of the virtual engine vehicle) (step S7). This driving force can be calculated based on the torque converter output torque To in consideration of the deceleration in the transmission, the deceleration in a final reduction gear unit er, and the size of the tires. Furthermore, by subtracting the running resistance from the driving force and dividing the remaining force by the vehicle body mass of the virtual engine vehicle, the acceleration in the front-rear direction of the virtual engine vehicle is calculated.

More specifically, acceleration a (see FIG. 2) in the front-rear direction of the virtual engine vehicle as the variable data 1 is a value obtained by dividing a value obtained by subtracting vehicle running resistance D (see FIG. 2) (as variable data 1) and a braking force applied to the virtual engine vehicle from the vehicle driving force based on the torque converter output torque To, as indicated by Formula (8) below, by the sum of a vehicle body mass calculated from all-up weight W (see FIG. 3) of the vehicle body of the virtual engine vehicle, an engine equivalent mass calculated from an inertial moment Ie (see FIG. 3) of the virtual engine, and a tire equivalent mass calculated from an inertial moment It (see FIG. 3) of the tires preset and recorded as the vehicle data 2. At this time, the vehicle running resistance D is calculated using a vehicle air resistance CdA and a vehicle rolling resistance Dr (see FIG. 3) preset and recorded as the vehicle data 2. Note that, in Formula (8) below, "Tm" is the gearbox loss torque (see FIG. 3) of the virtual engine vehicle preset and recorded as the vehicle data 2, "R" is the total reduction ratio (see FIG. 2) of the virtual torque converter as the variable data 1, "r" is the tire radius (see FIG. 3) preset and recorded as the vehicle data 2, "D" is the vehicle running resistance (see FIG. 2) of the virtual engine vehicle as the variable data 1, and "W" is the vehicle total weight (see FIG. 3) of the virtual engine vehicle preset and recorded as the vehicle data 2. Further, in Formula (8) below, the influence of the braking force (brake) of the virtual engine vehicle and the road gradient resistance is not considered.

$$a = \{(To \times Tm) \times R/r - D\} / \{W/9.8 + Ie \times (R/r)^2 + It \times (1/r)^2\} \qquad (8)$$

Next, the virtual engine rotation speed generation unit 100 calculates the vehicle running speed of the virtual engine vehicle by integrating (summing in discrete calculus as digital processing) the acceleration a in the front-rear direction of the virtual engine vehicle calculated in step S7 above (step S8). That is, the virtual engine rotation speed generation unit 100 calculates the change in vehicle running speed of the virtual engine vehicle by multiplying the calculation cycle time Δt of the present embodiment by the above acceleration a, and adds a current vehicle running speed V thereto to calculate a vehicle running speed V' of a next calculation cycle (that is, the calculation cycle of the next steps S4 to S12).

More specifically, the virtual engine rotation speed generation unit 100 calculates the vehicle running speed V' (see FIG. 2) of the virtual engine vehicle as the variable data 1 of the next calculation cycle (after Δt milliseconds) by Formula (9) below using the acceleration a calculated in step S7 (acceleration calculated using the physical model of the above virtual engine vehicle based on the accelerator opening Ap). Note that, in Formula (9) below, "V" is the vehicle running speed (see FIG. 2) of the virtual engine vehicle as the variable data 1.

$$V' = V + a \times 0.001 \times \Delta t \times 3.6 \qquad (9)$$

Here, the above vehicle running resistance D originally includes the gradient resistance due to the road gradient, but the gradient of the road on which the mounted electric vehicle actually runs cannot be specified in advance, so that in the sound signal generation processing of the present embodiment, a flat road is assumed, and the above gradient resistance is ignored. Thus, the acceleration a calculated by Formula (8) above can be different from the acceleration actually applied in the front-rear direction of the mounted electric vehicle. Further, in addition to this, even when the accelerator opening is the same, the output torque of the motor of the mounted electric vehicle and the output torque of the virtual engine are not always the same, and, on this point also, the acceleration a (see Formula (8) above) calculated by the vehicle physical model of the virtual engine vehicle can be different from the actual acceleration of the mounted electric vehicle (that is, an error can occur). Therefore, in the sound signal generation processing of the present embodiment, the above running speed data SP (in other words, vehicle running speed Vm (see FIG. 2) as variable data 1) is acquired from the mounted electric vehicle, and the vehicle running speed Vm is used to modify the vehicle running speed V' of the virtual engine vehicle (step S8). At this time, the cycle of acquisition of the vehicle running speed Vm of the mounted electric vehicle is longer than the above calculation cycle time Δt in the sound signal generation device of the present embodiment regarding the virtual engine vehicle. Further, at the time of the modification, it is preferable to perform the fluctuation mitigation processing of the present embodiment described below so that the vehicle running speed Vm of the mounted electric vehicle does not change suddenly.

More specifically, in order to eliminate the error between the vehicle running speed V' of the virtual engine vehicle calculated using Formula (9) above and the actual vehicle running speed Vm of the mounted electric vehicle, as illustrated in FIG. 7, the virtual engine rotation speed generation unit 100 uses the vehicle running speed Vm newly acquired from the mounted electric vehicle (indicated by ※ in FIGS. 7 and 8) and the change in vehicle running speed V' to the acquisition of the new vehicle running speed Vm to modify the vehicle running speed V' after timing of the above acquisition. At this time, the cycle of the acquisition of the vehicle running speed Vm becomes longer than the calculation cycle time Δt of the present embodiment as described above, and furthermore, in a case where there is a deviation Er between the vehicle running speed V' and the vehicle running speed Vm of the mounted electric vehicle as illustrated in FIG. 7, when it is simply modified using the vehicle running speed Vm of the mounted electric vehicle as illustrated in FIG. 7, a large discontinuity occurs as the vehicle running speed V', which can cause unnaturalness (discontinuous state) in the engine sound that is finally output in the vehicle of the mounted electric vehicle. In order to eliminate this unnaturalness, the virtual engine rotation speed generation unit 100, as illustrated in FIG. 8, as the fluctuation mitigation processing of the present embodiment, preferably shifts back the vehicle running speed Vm (see ※ in FIG. 8) newly acquired from the mounted electric vehicle by a preset time Δtt, sets a plurality of vehicle running speeds (indicated by □ in FIG. 8) so that the new vehicle running speed Vm is gently connected to the vehicle running speed V' (indicated by ★ in FIG. 8) immediately before the actual acquisition, and modifies the vehicle running speed V' by sandwiching them (step S8. See the dashed-and-dotted line arrow in FIG. 8). At this time, it is preferable that the fluctuation mitigation processing of the embodiment is executed every time a new vehicle running speed Vm is acquired as illustrated in FIG. 8.

Next, the virtual engine rotation speed generation unit 100 simulates the selection of the transmission gear of the virtual engine vehicle (step S9). That is, when the mounted electric vehicle starts running, the transmission gear of the virtual engine vehicle is set to "first gear", but when the vehicle runs at the first gear, the engine rotation speed N increases quickly, and the upper limit Nmax is quickly reached. Therefore, it is necessary to switch the transmission gear, but it is difficult to demand the driver of the mounted electric vehicle to perform such operation. Here, in an actual engine vehicle, a so-called AT is often provided and the transmission gear is automatically selected, and therefore in the sound signal generation processing of the present embodiment, the automatic selection of the transmission gear in this AT vehicle is simulated.

More specifically, in the AT of a general engine vehicle, an appropriate transmission gear is configured to be selected according to the accelerator opening and the vehicle running speed, but the gear shifting control characteristics are indicated by a so-called "automatic gear shifting diagram" illustrated in FIG. 9. As illustrated in FIG. 3, this automatic gear shifting diagram is preset as "automatic gear shifting-related table data" in the vehicle data 2 and recorded in the database DB. At this time, different transmission gears are selected during acceleration and deceleration. Here, in the automatic gear shifting control characteristics of the virtual engine vehicle illustrated in FIG. 9, the horizontal axis is vehicle running speed V and the vertical axis is accelerator opening Ap. Then, when the driving state of the virtual engine vehicle (driving state indicating the vehicle running speed and accelerator opening at that point of time) is indicated by "●" in FIG. 9, since the vehicle running speed increases during acceleration, ● moves from left to right in FIG. 9, and the transmission gear is shifted up to the next stage at the timing when the solid line is crossed from the left. On the other hand, since the vehicle running speed decreases during deceleration (when the acceleration a of the virtual engine vehicle is a negative value), ● moves from right to left in FIG. 9 and the transmission gear is shifted down to the next stage at the timing when the broken line is crossed from the right side. Thus, the virtual engine rotation speed generation unit 100 simulates selection of the transmission gear as the virtual engine with using the vehicle running speed V' of the virtual engine vehicle, the value of the acceleration a and the automatic gear shifting diagram (that is, the automatic gear shifting diagram corresponding to the actual AT) illustrated in FIG. 9 based on the accelerator opening Ap.

Next, the virtual engine rotation speed generation unit 100 uniquely calculates the above rotation speed N' of the virtual engine vehicle on the basis of the vehicle running speed V' of the virtual engine vehicle calculated in steps S2 to S9 above and the reduction ratio of the transmission gear (see step S9 above) selected at that point of time, and outputs the rotation speed N' to the artificial engine sound generation unit 101 via the bus 12 (step S10). That is, the virtual engine rotation speed generation unit 100 obtains the rotation speed of the tires from the vehicle running speed V' of the virtual engine vehicle, and furthermore calculates back the engine rotation speed N' of the virtual engine from a total reduction ratio R of the entire drive system of the virtual engine vehicle. At this time, the above total reduction ratio R is a product of a final reduction ratio Rf (see FIG. 3) preset and recorded as the vehicle data 2 and a reduction ratio Rtn (see FIG. 3) (preset and recorded as the vehicle data 2) of the transmission gear selected to an n-th gear at that point of time.

Here, the above-described method of calculating the engine rotation speed N' by back calculation is established only in a case where the lockup clutch of the virtual torque converter is engaged. This is because, in the state where the above lockup clutch is not engaged, since there is so-called "slip" as the virtual torque converter, the engine rotation speed N' and the rotation speed of the drive system are not equal. Therefore, the virtual engine rotation speed generation unit 100 first acquires a rotation angular acceleration α of the engine and integrates it to calculate the engine rotation speed N' when the above lockup clutch is not engaged. At this time, the rotation angular acceleration a of the virtual engine is a value obtained by dividing the torque for turning the virtual engine by the inertial moment Ie (see FIG. 3) of the virtual engine as the vehicle data 2. Note that the torque for turning the virtual engine is a residual torque obtained by subtracting the torque converter input torque Tin from the engine output torque To during acceleration, but is the difference between the torque transmitted from the drive system and the engine loss torque during deceleration.

More specifically, in a case where the above lockup clutch is engaged, the virtual engine rotation speed generation unit 100 calculates the engine rotation speed N' using Formula (10) below.

$$N'=V'\times R\times 60/(r\times 2\pi \times 3.6) \quad (10)$$

On the other hand, in a case where the above lockup clutch is not engaged and there is slip, the virtual engine rotation speed generation unit 100 calculates the engine rotation speed N' using Formula (11) below. Note that, in Formula (11), "Tr" is the engine residual torque (see FIG. 2) as the variable data 1, and "Te" is the output torque of the virtual engine calculated in step S5.

$$Tr=Te-Tin$$

$$\alpha=Tr/Ie$$

$$N'=N+0.001\times \Delta t\times \alpha \times 60/2\pi \quad (11)$$

Finally, the artificial engine sound generation unit 101 of the processing unit 10 artificially generates a sound signal corresponding to the sound of the virtual engine by, for example, the same method as the conventional method on the basis of the rotation speed data corresponding to the engine rotation speed N' of the virtual engine vehicle calculated in step S10 above and the accelerator opening Ap indicated by the accelerator opening data AC, and outputs the sound signal to the speaker 14 via the bus 12 (step S11). At this time, the rotation speed N' of the above engine is one of the engine rotation speed N' in the case where the above lockup clutch is engaged (see Formula (10)) or the above engine rotation speed N' (see Formula (11)) in the case where the lockup clutch is not engaged and there is slip. Thus, the sound signal is output in real time as the sound of the virtual engine into the vehicle of the mounted electric vehicle via the speaker 14.

Then, the processing unit 10 determines whether or not the above engine start switch provided in the mounted electric vehicle has been turned off because, for example, a destination has been reached (step S12). In the determination of step S12, when the above engine start switch is turned off (step S12: YES), the processing unit 10 ends the sound signal generation processing of the present embodiment. On the other hand, in the determination of step S12, when the above engine start switch is not turned off (step S12: NO), the processing unit 10 returns to step S4 and repeats steps S4 to S12 described above.

Here, the cycle in which steps S4 to S12 above are repeated is a repetition cycle for each calculation cycle time Δt above (for example, about 10 milliseconds to 20 milliseconds), and this repetition cycle depends on the performance or the like of the hardware such as the CPU or the like constituting the processing unit 10. In this case, when the repetition cycle is set too long, there arises a problem that the change in engine rotation speed N' of the virtual engine cannot be felt smoothly. On the other hand, when the repetition cycle is extremely short, the processing load of the above hardware or the like becomes high, and the processing cannot keep up, so that correct processing cannot be performed.

As described above, according to the sound signal generation processing of the present embodiment, the vehicle running speed V' of the virtual engine vehicle is modified on the basis of the vehicle running speed Vm of the mounted electric vehicle (see FIG. 4, step S8, and FIGS. 7 and 8), the engine rotation speed N' of the virtual engine is calculated on the basis of the modified vehicle running speed V', and an engine sound corresponding to the running state of the mounted electric vehicle is artificially generated on the basis of the engine rotation speed N' and the accelerator opening Ap (that is, accelerator operation amount). Therefore, even in a case where there can occur a difference in output torque or a difference in acceleration due to a difference in torque characteristics between the motor and the engine which are the drive source of the mounted electric vehicle, and a deviation in vehicle running speed due to the influence of the road gradient, since it is possible to obtain almost the same engine rotation speed as when the torque converter AT engine vehicle is caused to run, for example, even in the case of an electric vehicle on which an engine of an internal combustion type is not mounted, a realistic engine sound linked to the running of the electric vehicle can be artificially generated.

More specifically, the vehicle running speed of a car is generally calculated from a rotation pulse signal of the axle, but since the axle has a lower rotation speed than the engine and the number of pulses per tire rotation is also small, the update cycle of the vehicle running speed becomes long particularly at the time of low speed running, and it is difficult to obtain a change in engine rotation speed N' that the passenger feels smoothly. Therefore, when the engine rotation speed N' of the virtual engine is calculated on the basis only of the running speed data SP acquired from the mounted electric vehicle, it is not possible to obtain a change in realistic engine rotation speed. Therefore, in the sound signal generation processing of the present embodiment, when a running simulation of the virtual engine vehicle is performed on the basis of the accelerator opening data AC, while balancing to the processing capacity of the processing unit 10, a vehicle physical model that artificially reproduces (simulates) a virtual engine vehicle is set to artificially generate a realistic engine sound.

Note that, in the sound signal generation processing of the present embodiment, the information regarding the brake in a virtual engine vehicle is not used. Regarding this point, the accelerator itself is closed when braking by the brake, so that the engine sound is smaller and less noticeable than when the accelerator is open, and the followability of the vehicle running speed V' and the engine rotation speed N' as the virtual engine vehicle does not need to be considered more rigorously than when accelerating with the accelerator opened.

Further, since the acquisition of the accelerator opening data AC, the acquisition of the running speed data SP, and the modification of the vehicle running speed V' are performed for each prescribed cycle (see FIG. 4), by setting the cycle short in relation to the processing load in the processing unit 10, it is possible to artificially generate an engine sound with high accuracy.

Furthermore, since the engine rotation speed N' is calculated using at least the modified vehicle running speed V' and a transmission gear ratio Rtn based on a prescribed automatic gear shifting diagram (see FIG. 9), a realistic and artificial engine sound can be generated while reducing the processing load of the processing unit 10. More specifically, as illustrated in FIG. 10, in a case where the engine rotation speed N' of the virtual engine is simply proportional to the vehicle running speed Vm of the mounted electric vehicle, for example, since a change in engine rotation speed N' at the time of starting the virtual engine vehicle cannot be simulated and the automatic gear shifting of the transmission gear cannot be simulated, it is difficult to output a realistic engine sound. On the other hand, by the sound signal generation processing of the present embodiment, as illustrated in FIG. 10 regarding the two types of the accelerator opening Ap, a change in engine rotation speed N' at the time of starting the virtual engine vehicle or automatic gear shifting of the transmission gear can be simulated, and it is possible to artificially generate a more realistic engine sound.

Furthermore, since the vehicle running speed V' of the virtual engine vehicle is calculated by excluding the influence of the road gradient and the influence of the braking resistance that are negligible when generating an artificial engine sound, the influence of the negligible factors excluded, and it is possible to artificially generate an engine sound while further reducing the processing burden of the processing unit 10.

INDUSTRIAL APPLICABILITY

As described above respectively, the present invention can be applied to the field of sound signal generation devices, and when applied particularly to the field of sound signal generation devices that output an engine sound of an engine of an internal combustion type into an electric vehicle, a particularly remarkable effect can be obtained.

DESCRIPTION OF REFERENCE NUMERALS

1 Variable data
2 Vehicle data
10 Processing unit
11 Interface
12 Bus
13 D/A converter
14 Speaker
100 Virtual engine rotation speed generation unit
101 Artificial engine sound generation unit
S Sound signal generation device
AC Accelerator opening data
DB Database
SP Running speed data

The invention claimed is:

1. A sound signal generation device comprising:
an operation amount data acquisition means, being a processing unit comprising a central processing unit (CPU) and a memory, that acquires operation amount data indicating an accelerator operation amount in an electric vehicle on which an electric motor for vehicle driving is mounted;
a running speed data acquisition means, being the processing unit comprising the central processing unit (CPU) and the memory, that acquires running speed data indicating running speed of the electric vehicle;
a virtual running speed calculation means, being the processing unit comprising the central processing unit (CPU) and the memory, that calculates a virtual running speed of a vehicle on which an engine of an internal combustion type is mounted;
a modification means, being the processing unit comprising the central processing unit (CPU) and the memory, that modifies the calculated virtual running speed on the basis of the acquired running speed data;
a virtual rotation speed calculation means, being the processing unit comprising the central processing unit (CPU) and the memory, that calculates a virtual rotation speed of the engine on the basis of the modified virtual running speed; and
a generation means, being the processing unit comprising the central processing unit (CPU) and the memory, that generates an artificial engine sound signal indicating an artificial sound of the engine corresponding to a running state of the electric vehicle on the basis of the accelerator operation amount indicated by the acquired operation amount data and the calculated virtual rotation speed,
wherein the virtual running speed calculation means calculates the virtual running speed by excluding an influence of a gradient of a road on which the electric vehicle moves and an influence of braking resistance of the electric vehicle.

2. The sound signal generation device according to claim 1, wherein
the operation amount data acquisition means acquires the operation amount data at each preset operation amount data acquisition cycle,
the running speed data acquisition means acquires the running speed data at each preset running speed data acquisition cycle, and
the modification means modifies the virtual running speed at each preset modification cycle.

3. The sound signal generation device according to claim 2, wherein
the virtual rotation speed calculation means calculates the virtual rotation speed by using at least the modified virtual running speed and a gear ratio based on an automatic gear shifting diagram preset corresponding to the engine.

4. The sound signal generation device according to claim 1, wherein
the virtual rotation speed calculation means calculates the virtual rotation speed by using at least the modified virtual running speed and a gear ratio based on an automatic gear shifting diagram preset corresponding to the engine.

5. The sound signal generation device according to claim 1, wherein
the virtual running speed calculation means calculates the virtual running speed on the basis of a relationship between a rotation speed of the engine and an output torque as the engine, and
the output torque is calculated on the basis of the accelerator operation amount indicated by the acquired operation amount data and an output torque coefficient corresponding to the accelerator operation amount.

6. The sound signal generation device according to claim 1, wherein
the modification means modifies the virtual running speed at a timing later than a timing of acquisition of the running speed data by using the acquired running speed data.

7. A sound signal generating method executed in a sound signal generation device comprising an operation amount data acquisition means, a running speed data acquisition means, a virtual running speed calculation means, a modification means, a virtual rotation speed calculation means, and a generation means, the method including:
a step of acquiring, by the operation amount data acquisition means, being a processing unit comprising a central processing unit (CPU) and a memory, operation amount data indicating an accelerator operation amount in an electric vehicle on which an electric motor for vehicle driving is mounted;
a step of acquiring, by the running speed data acquisition means, being the processing unit comprising the central processing unit (CPU) and the memory, running speed data indicating running speed of the electric vehicle;
a step of calculating, by the virtual running speed calculation means, being the processing unit comprising the central processing unit (CPU) and the memory, a virtual running speed of a vehicle on which an engine of an internal combustion type is mounted;
a step of modifying, by the modification means, being the processing unit comprising the central processing unit (CPU) and the memory, the calculated virtual running speed on the basis of the acquired running speed data;
a step of calculating, by the virtual rotation speed calculation means, being the processing unit comprising the central processing unit (CPU) and the memory, a virtual rotation speed of the engine on the basis of the modified virtual running speed; and
a step of generating, by the generation means, being the processing unit comprising the central processing unit (CPU) and the memory, an artificial engine sound signal indicating an artificial sound of the engine corresponding to a running state of the electric vehicle on the basis of the accelerator operation amount indicated by the acquired operation amount data and the calculated virtual rotation speed,
wherein the virtual running speed calculation means calculates the virtual running speed by excluding an influence of a gradient of a road on which the electric vehicle moves and an influence of bra king resistance of the electric vehicle.

8. A non-volatile recording medium recording a sound signal generation program causing a computer to execute:
a step of acquiring operation amount data indicating an accelerator operation amount in an electric vehicle on which an electric motor for vehicle driving is mounted;
a step of acquiring running speed data indicating running speed of the electric vehicle;
a step of calculating a virtual running speed of a vehicle on which an engine of an internal combustion type is mounted;
a step of modifying the calculated virtual running speed on the basis of the acquired running speed data;
a step of calculating a virtual rotation speed of the engine on the basis of the modified virtual running speed; and
a step of generating an artificial engine sound signal indicating an artificial sound of the engine corresponding to a running state of the electric vehicle on the basis of the accelerator operation amount indicated by the acquired operation amount data and the calculated virtual rotation speed,
wherein the virtual running speed is calculated by excluding an influence of a gradient of a road on which the electric vehicle moves and an influence of braking resistance of the electric vehicle.

* * * * *